US012764755B2

(12) United States Patent
Wang et al.

(10) Patent No.: US 12,764,755 B2
(45) Date of Patent: Oct. 13, 2026

(54) ENHANCED GROUP DCI FORMAT 2_3 FOR SRS TRANSMISSION

(71) Applicant: Intel Products IP LLC, Santa Clara, CA (US)

(72) Inventors: Guotong Wang, Beijing (CN); Alexei Davydov, Nizhny Novgorod (RU)

(73) Assignee: Intel Products IP LLC, Santa Clara, CA (US)

( * ) Notice: Subject to any disclaimer, the term of this patent is extended or adjusted under 35 U.S.C. 154(b) by 223 days.

(21) Appl. No.: 18/280,760

(22) PCT Filed: Apr. 5, 2022

(86) PCT No.: PCT/US2022/023404

§ 371 (c)(1),
(2) Date: Sep. 7, 2023

(87) PCT Pub. No.: WO2022/216654

PCT Pub. Date: Oct. 13, 2022

(65) Prior Publication Data

US 2024/0163897 A1 May 16, 2024

(30) Foreign Application Priority Data

| | | |
|---|---|---|
| Apr. 6, 2021 | (WO) | PCT/CN2021/085575 |
| Apr. 15, 2021 | (WO) | PCT/CN2021/087388 |
| Oct. 19, 2021 | (WO) | PCT/CN2021/124568 |

(51) Int. Cl.
*H04W 72/232* (2023.01)
*H04W 72/1273* (2023.01)

(52) U.S. Cl.
CPC ..... *H04W 72/232* (2023.01); *H04W 72/1273* (2013.01)

(58) Field of Classification Search
CPC ............. H04W 72/232; H04W 72/273; H04W 72/0446; H04W 72/0453; H04W 52/325;
(Continued)

(56) References Cited

U.S. PATENT DOCUMENTS 10,945,216 B2 * 3/2021 MolavianJazi ..... H04W 52/146
12,232,047 B2 * 2/2025 Yi ......................... H04L 5/0048
(Continued)

FOREIGN PATENT DOCUMENTS

WO WO-2020056180 A1 3/2020
WO WO-2022216654 A1 10/2022

OTHER PUBLICATIONS

"3GPP; TSG RAN; NR; Physical layer procedures for data (Release 16)", 3GPP TS 38.214 V16.5.0, (Mar. 30, 2021).
(Continued)

*Primary Examiner* — Rasheed Gidado
(74) *Attorney, Agent, or Firm* — Schwegman Lundberg & Woessner, P.A.

(57) ABSTRACT

An apparatus and system for aperiodic sounding reference signals (SRS) transmission are described. Downlink control information (DCI) format 2_3 indicates a Transmission Configuration Indicator (TCI) state for beam indication for transmission of an SRS triggered by the DCI. An explicit field is added to the DCI to indicate the TCI state or the TCI state of the scheduling carrier used to transmit the DCI is used for the SRS. The TCI state indicates a joint uplink/downlink TCI state or a separate uplink or downlink TCI state. The DCI indicates an available slot to use for the SRS explicitly in a DCI field or implicitly based on the component carrier used for transmission of the SRS, the slotOffset parameter, or the first available slot.

20 Claims, 8 Drawing Sheets

(58) Field of Classification Search
CPC ..... H04B 7/0695; H04L 5/0051; H04L 5/001; H04L 5/0092; H04L 5/0094
See application file for complete search history.

(56) References Cited

U.S. PATENT DOCUMENTS

| | | | | |
|---|---|---|---|---|
| 2019/0306801 | A1* | 10/2019 | Zhou | H04W 52/44 |
| 2019/0342907 | A1* | 11/2019 | Huang | H04W 72/23 |
| 2022/0264598 | A1* | 8/2022 | Xu | H04W 72/1263 |
| 2023/0180199 | A1* | 6/2023 | Jung | H04L 1/0038 370/329 |
| 2023/0262608 | A1* | 8/2023 | Gao | H04W 52/08 455/522 |

OTHER PUBLICATIONS

"Further discussion on remaining details of Aperiodic SRS for LTE Rel-10", R1-111670, 3GPP TSG RAN WG1 Meeting #65, Spain, Barcelona, (May 5, 2011), 3 pgs.

"International Application Serial No. PCT/US2022/023404, International Search Report mailed Jul. 26, 2022", 4 pgs.

"International Application Serial No. PCT/US2022/023404, Written Opinion mailed Jul. 26, 2022", 5 pgs.

"Moderator summary for multi-beam enhancement", Samsung, R1-2101185, 3GPP TSG RAN WG1 #104-e, e-Meeting, (Jan. 26, 2021), 37 pgs.

Bell, Shanghai Alcatel-Lucent, "Remaining Issues on Aperiodic SRS", 3GPP TSG RAN WG1 Meeting #63bis, Dublin, Ireland, (Jan. 31, 2011), 6 pgs.

"Japanese Application Serial No. 2023-557710, Notification of Reasons for Rejection mailed Feb. 3, 2026", W English Translation, 11 pgs.

Ericsson, "Configuration of SRS Carrier Switching", Tdoc R2-2005072, 3GPP TSG-RAN WG2 #110e, 2020, 21 pgs.

Qualcomm Incorporated, "Discussion on SRS enhancemen", R1-2101451, 3GPP TSG-RAN WG 1 Meeting #104-e, e-Meeting, 01 19 2021, 41 pgs.

* cited by examiner

ENHANCED GROUP DCI FORMAT 2_3 FOR SRS TRANSMISSION

PRIORITY CLAIM

This application is a U.S. National Stage Filing under 35 U.S.C. 371 from International Application No. PCT/US2022/023404, filed Apr. 5, 2022 and published in English as WO 2022/216654 on Oct. 13, 2022, which claims the benefit of priority to PCT Patent Application PCT/CN2021/085575, filed Apr. 6, 2021, PCT Patent Application PCT/CN2021/087388, filed Apr. 15, 2021, and PCT Patent Application PCT/CN2021/124568, filed Oct. 19, 2021, each which is incorporated herein by reference in its entirety.

TECHNICAL FIELD

Embodiments pertain to next generation (NG) wireless communications. In particular, some embodiments relate to signaling reference signal (SRS) transmission.

BACKGROUND

The use and complexity of new radio (NR) wireless systems, which include $5^{th}$ generation (5G) networks and are starting to include sixth generation (6G) networks among others, has increased due to both an increase in the types of devices UEs using network resources as well as the amount of data and bandwidth being used by various applications, such as video streaming, operating on these UEs. With the vast increase in number and diversity of communication devices, the corresponding network environment, including routers, switches, bridges, gateways, firewalls, and load balancers, has become increasingly complicated. As expected, a number of issues abound with the advent of any new technology.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
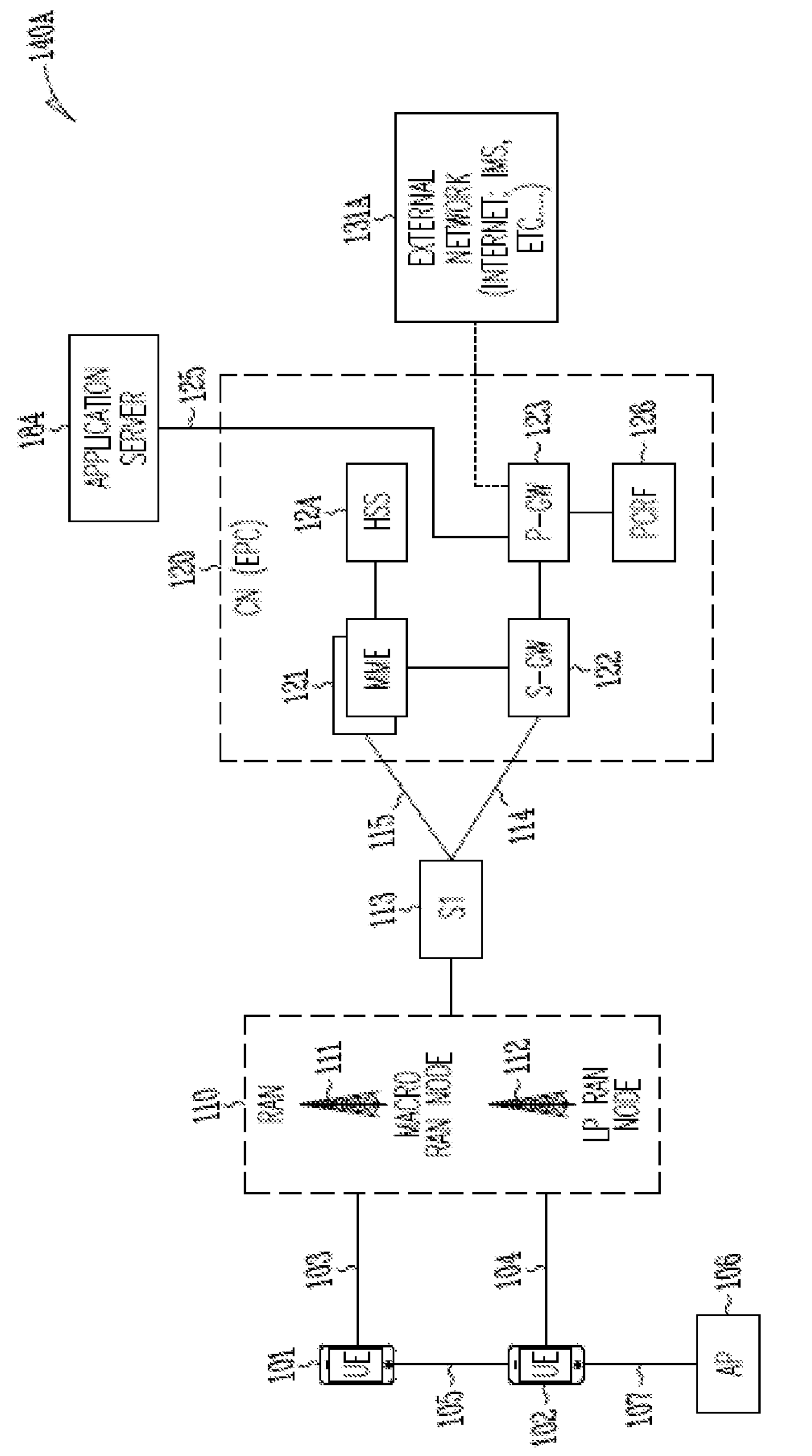
FIG. 1A illustrates an architecture of a network, in accordance with some aspects.

FIG. 1A illustrates an architecture of a network in accordance with some aspects. The network 140A includes 3GPP LTE/4G and NG network functions that may be extended to 6G functions. Accordingly, although 5G will be referred to, it is to be understood that this is to extend as able to 6G structures, systems, and functions. A network function can be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and other frequencies and Spectrum Access System (SAS) in 3.55-3.7 GHz and other frequencies). Different Single Carrier or Orthogonal Frequency Domain Multiplexing (OFDM) modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a 5G protocol, a 6G protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation ($5^{th}$ or $6^{th}$ generation) NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the CN 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP)

sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G or 6G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called MulteFire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture (or 6G system architecture) can include the RAN 110 and a 5G core network (5GC) 120. The NG-RAN 110 can include a plurality of nodes, such as gNBs and NG-eNBs. The CN 120 (e.g., a 5G core network/5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes. In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
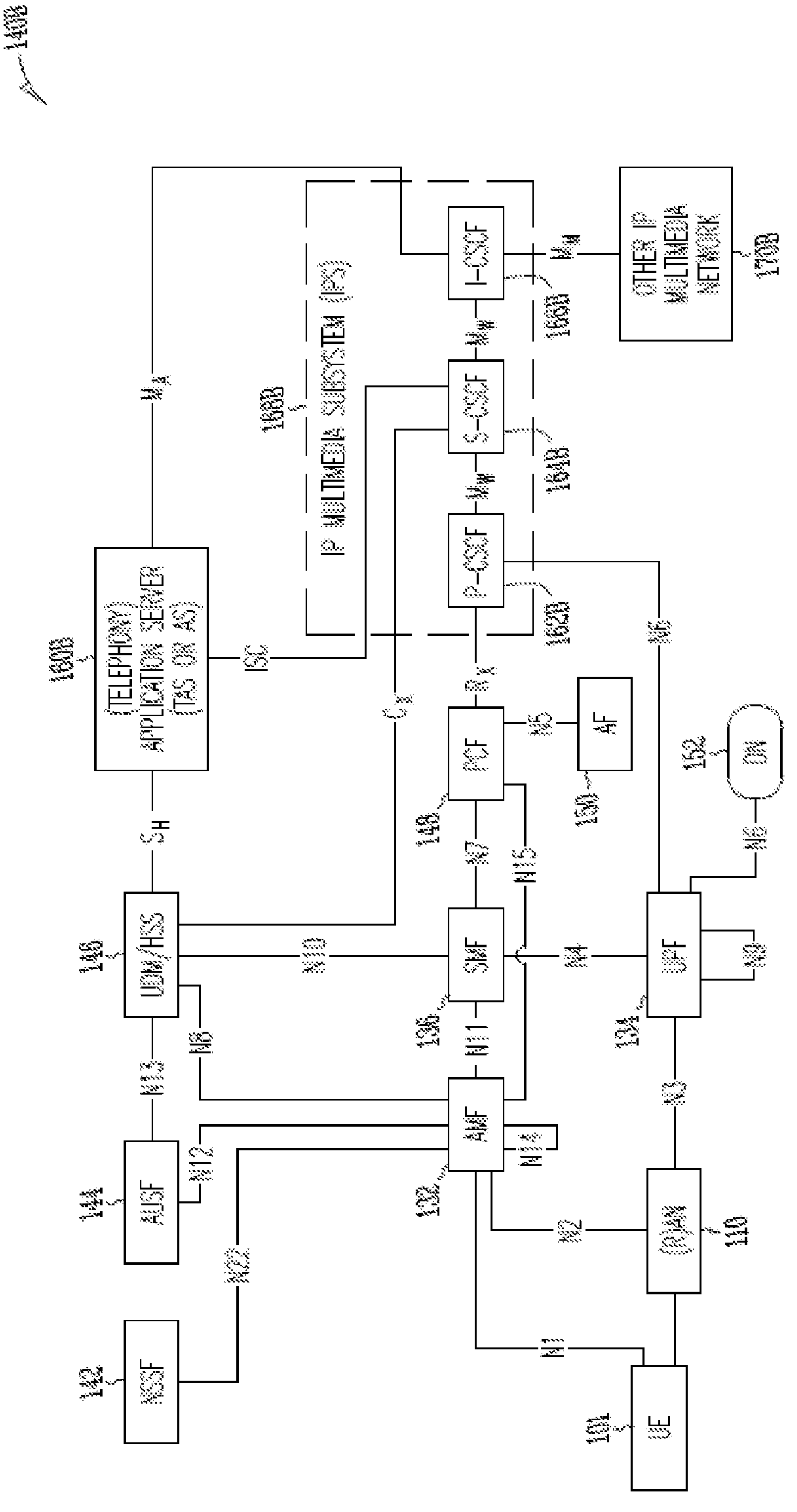
FIG. 1B illustrates a non-roaming 5G system architecture in accordance with some aspects.

FIG. 1B illustrates a non-roaming 5G system architecture in accordance with some aspects. In particular, FIG. 1B illustrates a 5G system architecture 140B in a reference point representation, which may be extended to a 6G system architecture. More specifically, UE 102 can be in communication with RAN 110 as well as one or more other 5GC network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 can be used to manage access control and mobility and can also include network slice selection functionality. The AMF 132 may provide UE-based authentication, authorization, mobility management, etc., and may be independent of the access technologies. The SMF 136 can be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 can be deployed in one or more configurations according to the desired service type and may be connected with a data network. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6

(between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SWIFs, not shown), and N22 (between AMF 132 and NSSF 142, not shown). Other reference point representations not shown in FIG. 1B can also be used.

Figure 1C:
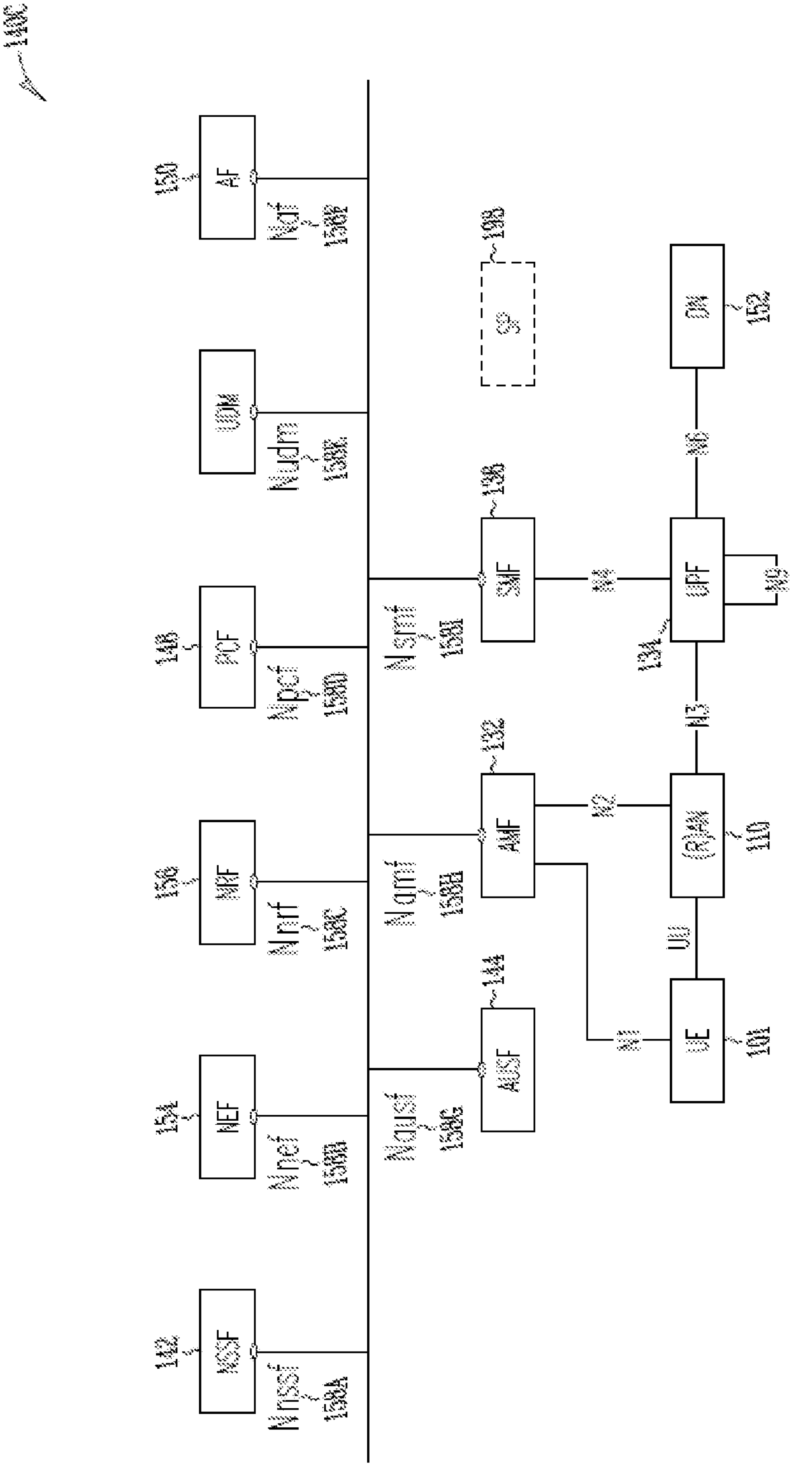
FIG. 1C illustrates a non-roaming 5G system architecture in accordance with some aspects.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 1581 (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems.

Figure 2:
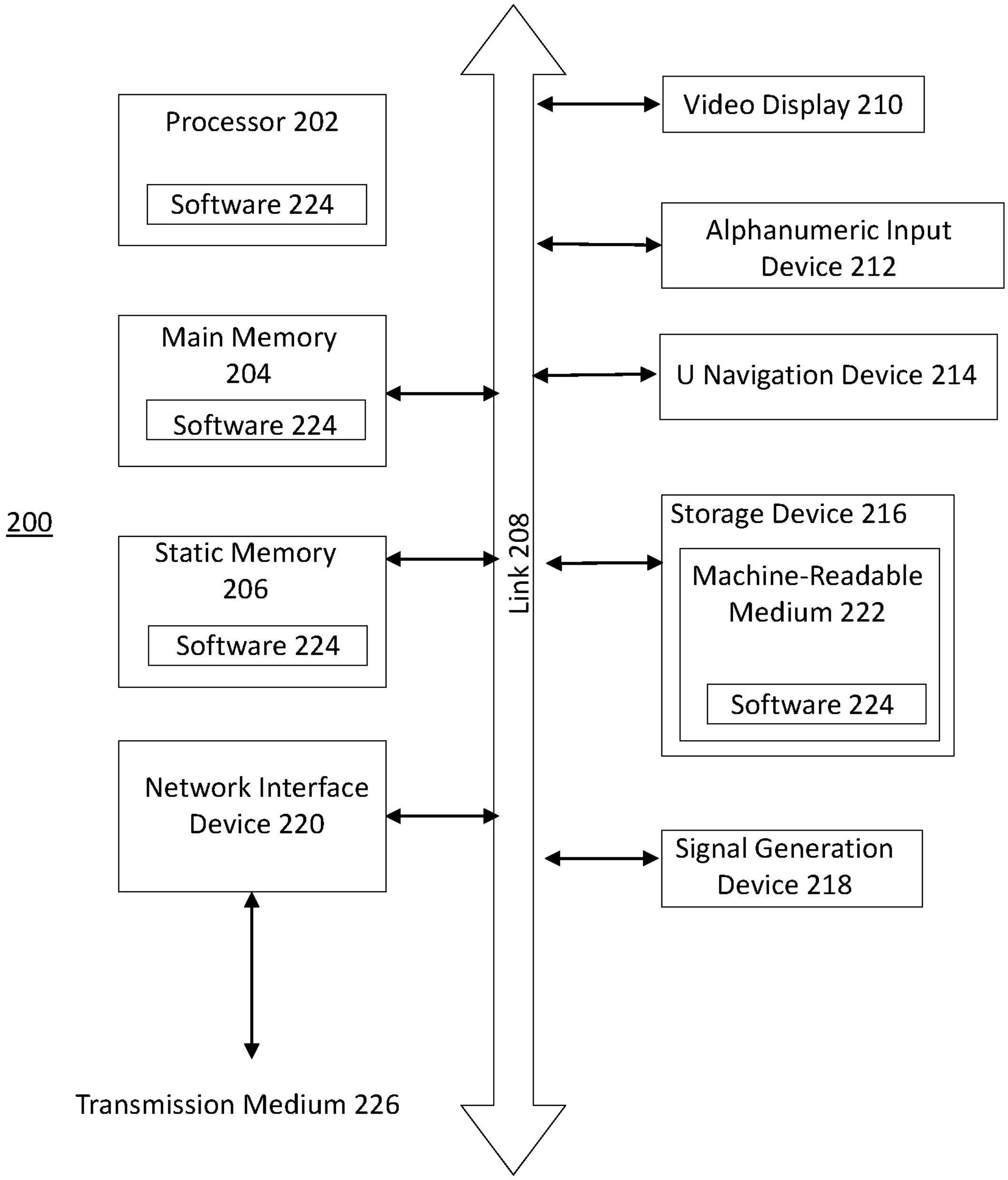
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIGS. 1A-1C. Note that communications described herein may be encoded before transmission by the transmitting entity (e.g., UE, gNB) for reception by the receiving entity (e.g., gNB, UE) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of wireless local area network (WLAN) transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/5$^{th}$ generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 5G, 5G New Radio (5G NR), 3GPP 5G New Radio, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (WITS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth(r), Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p or IEEE 802.11bd and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz or above (typically up to 5935 MHz following change proposals in CEPT Report 71)), the European ITS-G5 system (i.e. the European flavor of IEEE 802.11p based DSRC, including ITS-G5A (i.e., Operation of ITS-G5 in European ITS frequency bands dedicated to ITS for safety re-lated applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz), IEEE 802.11bd based systems, etc.

Aspects described herein can be used in the context of any spectrum management scheme including dedicated licensed spectrum, unlicensed spectrum, license exempt spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3800-4200 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively. Next generation Wi-Fi system is expected to include the 6 GHz spectrum as operating band but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHz, 3800-4200 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (note: this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme is possible, e.g., by introducing a hierarchical prioritization of usage for different types of users (e.g., low/medium/high priority, etc.), based on a prioritized access to the spectrum e.g., with highest priority to tier-1 users, followed by tier-2, then tier-3, etc. users, etc.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

Some of the features are defined for the network side, such as APs, eNBs, NR or gNBs—note that this term is typically used in the context of 3GPP 5G and 6G communication systems, etc. Still, a UE may take this role as well and act as an AP, eNB, or gNB; that is some or all features defined for network equipment may be implemented by a UE.

As above, in NR Rel-15 spec, different types of SRS resource sets are supported. The SRS resource set is configured with a parameter of 'usage', which can be set to 'beamManagemene', 'codebook', 'nonCodebook' or 'antennaSwitching'. An SRS resource set configured for 'beamManagement' is used for beam acquisition and uplink beam indication using SRS. An SRS resource set configured for 'codebook' and 'nonCodebook' is used to determine the uplink (UL) precoding by explicit indication using a transmission precoding matrix index (TPMI) or implicit indication using an SRS resource index (SRI). Finally, an SRS resource set configured for 'antennaSwitching' is used to acquire downlink (DL) channel state information (CSI) using SRS measurements in the UE by leveraging reciprocity of the channel in time domain duplexing (TDD) systems. For SRS transmission, the time domain behavior may be periodic, semi-persistent or aperiodic. The radio resource control (RRC) configuration for the SRS resource set is:

```
SRS-ResourceSet ::=                         SEQUENCE {
   srs-ResourceSetId                         SRS-ResourceSetId,
   srs-ResourceIdList                        SEQUENCE (SIZE(1..maxNrofSRS-
ResourcesPerSet)) OF SRS-ResourceId   OPTIONAL, -- Cond Setup
   resourceType                             CHOICE {
      aperiodic                             SEQUENCE {
         aperiodicSRS-ResourceTrigger       INTERGER (1..maxNrofSRS-
TriggerStates-1),
         csi-RS                              NZP-CSI-RS-ResourceId
OPTIONAL, -- Cond NonCodebook
         slotOffset                          INTEGER (1..32)
OPTIONAL, -- Need S
         ...,
         [[
         aperiodicSRS-ResourceTriggerList              SEQUENCE
(SIZE(1..maxNrofSRS-TriggerStates-2))
                                               OF INTEGER (1..maxNrofSRS-
TriggerStates-1)   OPTIONAL -- Need M
         ]]
      },
      semi-persistent                        SEQUENCE {
         associatedCSI-RS                        NZP-CSI-RS-ResourceId
OPTIONAL, -- Cond NonCodebook
         ...
      },
      periodic                              SEQUENCE {
         associatedCSI-RS                        NZP-CSI-RS-ResourceId
OPTIONAL, -- Cond NonCodebook
         ...
      }
   },
   usage                                 ENUMERATED {beamManagement, codebook,
nonCodebook, antennaSwitching},
   alpha                                 Alpha
OPTIONAL, -- Need S
   p0                                   INTEGER (−202..24)
OPTIONAL, -- Cond Setup
   pathlossReferenceRS                        PathlossReferenceRS-Config
OPTIONAL, -- Need M
...
The RRC configuration for the SRS resource is:
SRS-Resource ::=                            SEQUENCE {
   srs-ResourceId                           SRS-ResourceId,
   nrofSRS-Ports                            ENUMERATED {port1, ports2, ports4},
   ptrs-PortIndex                           ENUMERATED {n0, n1 }
OPTIONAL,   -- Need R
   transmissionComb                          CHOICE {
      n2                                  SEQUENCE {
         combOffset-n2                           INTEGER (0..1),
         cyclicShift-n2                         INTEGER (0..7)
      },
      n4                                  SEQUENCE {
         combOffset-n4                           INTEGER (0..3),
         cyclicShift-n4                         INTEGER (0..11)
      }
   },
   resourceMapping                           SEQUENCE {
      startPosition                         INTEGER (0..5),
      nrofSymbols                            ENUMBERATED {n1, n2, n4},
      repetitionFactor                       ENUMBERATED {n1, n2, n4}
   },
   freqDomainPosition                         INTEGER (0..67),
   freqDomainShift                           INTEGER (0..268),
   freqHopping                             SEQUENCE {
      c-SRS                                INTEGER (0..63),
      b-SRS                                INTEGER (0..3),
      b-hop                               INTEGER (0..3)
   },
   groupOrSequenceHopping                          ENUMERATED { neither,
groupHopping, sequenceHopping },
   resourceType                             CHOICE {
      aperiodic                             SEQUENCE {
         ...
      },
      semi-persistent                        SEQUENCE {
         periodicityAndOffset-sp                    SRS-PeriodicityAndOffset,
         ...
      },
```

-continued

```
    periodic                              SEQUENCE {
      periodicityAndOffset-p                        SRS-PeriodicityAndOffset,
      ...
    }
  },
  sequenceId                            INTEGER (0..1023),
  spatialRelationInfo                     SRS-SpatialRelationInfo
OPTIONAL,   -- Need R
  ...,
```

When the SRS resource set is configured as 'aperiodic', the SRS resource set also includes configuration of the slot offset (slotOffset) and trigger state(s) (aperiodicSRS-ResourceTrigger, aperiodicSRS-ResourceTriggerList). The slotOffset parameter defines the slot offset relative to the physical downlink control channel (PDCCH) where the SRS transmission should be commenced. The triggering state(s) defines which DCI codepoint(s) triggers the corresponding SRS resource set transmission.

The aperiodic SRS may be triggered via an SRS Request field in the DCI. The SRS Request field may be carried by DCI format 0_1/0_2/1_1/1_2/2_3. DCI format 0_1/0_2 is used for scheduling a physical uplink shared channel (PUSCH), DCI format 1_1/1_2 is used for scheduling a physical downlink shared channel (PDSCH), and DCI format 2_3 is used to trigger aperiodic SRS for a group of UEs. In more detail, DCI format 2_3 is used for transmission of a group of Transmit Power Control (TPC) commands for SRS transmissions (and in some cases, an SRS request) by one or more UEs. The block information in the DCI is using a cyclic redundancy code (CRC) scrambled a Radio Network Temporary Identifier (TPC-SRS-RNTI). For a specific UE, a parameter startingBnOfFormat2-3 provided by a RRC configuration within SRS-TPC-CommandConfig indicates the starting bit position of a block within the group DCI with SRS request fields and TPC commands. DCI format 2_3 is applicable for uplink carrier(s) of serving cells where a UE is not configured for PUSCH and PUCCH transmissions or for uplink carrier(s) of a serving cell where srs-PowerControlAdjustmentStates indicates a separate power control adjustment state between SRS transmissions and PUSCH transmissions.

In Rel-17, a joint DL/UL TCI state may be indicated to the UE. In this case, the joint TCI state (common beam) is used for DL and UL transmission/reception. A separate DL/UL TCI state may also be configured to the UE. The separate TCI state (separate beam) is used for DL and UL.

In some cases, DCI format 2_3 may trigger SRS transmission for carrier switching (the SRS is configured with usage of antennaSwitching by RRC signaling). The SRS may be transmitted in another UL carrier(s) that is not configured with PUSCH/PUCCH.

Figure 3A:
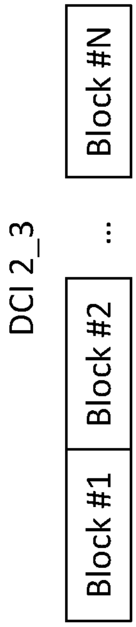
FIG. 3A illustrates downlink control information (DCI) format 2_3 in accordance with some aspects.
Figure 3B:
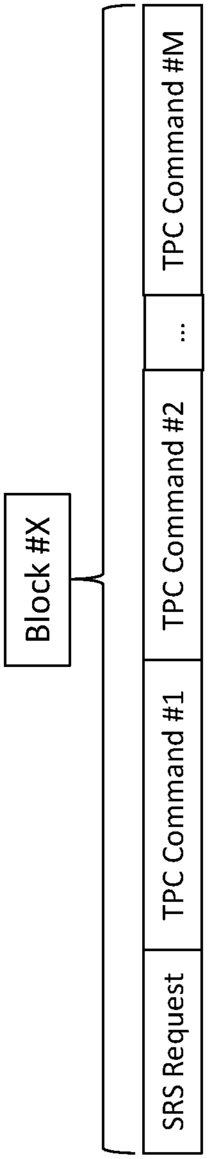
FIG. 3B illustrates a single block DCI format 2_3 in accordance with some aspects.
Figure 3C:
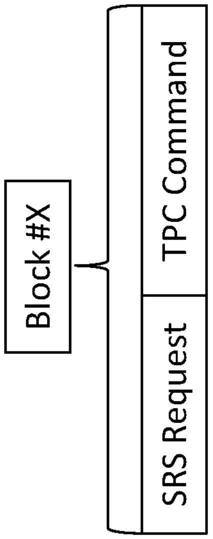
FIG. 3C illustrates one or more blocks DCI format 2_3 in accordance with some aspects.

FIG. 3A illustrates downlink control information (DCI) format 2_3 in accordance with some aspects. FIG. 3B illustrates a single block DCI format 2_3 in accordance with some aspects. FIG. 3C illustrates one or more blocks DCI format 2_3 in accordance with some aspects. As shown in FIG. 3A, the DCI format 2_3 contains multiple blocks. In FIG. 3B, the UE is configured with one block, multiple TPC commands are included in the block, and each TPC command applies to one UL carrier. In FIG. 3B, the UE may be configured with one or more blocks, and each block applies to one UL carrier.

In Rel-17, if the TCI state is utilized for uplink transmission, for an SRS triggered by DCI 2_3, if the target carrier (used to transmit the SRS) is not configured with a UL TCI because there is no PUSCH/PUCCH, then following the current DCI 2_3 format, no beam information for SRS transmission is included.

Enhanced DCI Format 2_3 for SRS Transmission

Accordingly, in some embodiments, a new dedicated field may be added in DCI format 2_3 for beam indication. The new field indicates the TCI state to be used for the transmission of the aperiodic SRS triggered by the DCI. The field may indicate a joint DL/UL TCI state if joint DL/UL TCI state is used or a separate UL TCI state if a separate DL/UL TCI state is used.

Figure 4A:
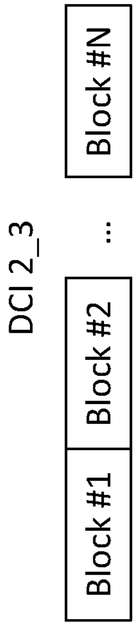
FIG. 4A illustrates DCI format 2_3 in accordance with some aspects.
Figure 4B:
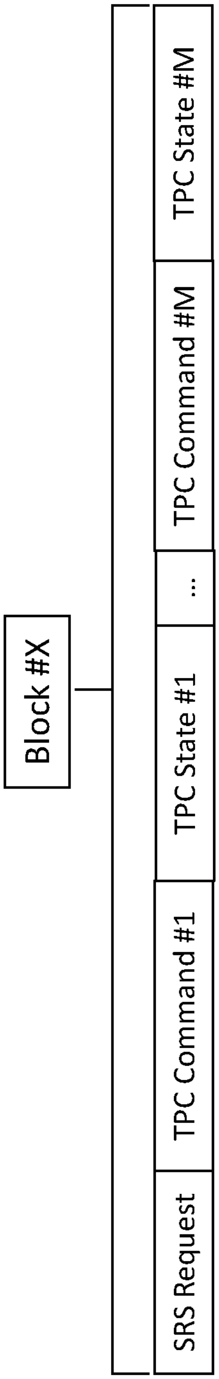
FIG. 4B illustrates a single block DCI format 2_3 with Transmission Configuration Indicator (TCI) state in accordance with some aspects.
Figure 4C:
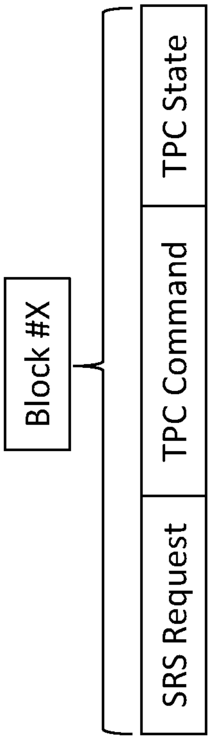
FIG. 4C illustrates one or more blocks DCI format 2_3 with TCI state in accordance with some aspects.

FIG. 4A illustrates DCI format 2_3 with TCI state in accordance with some aspects. FIG. 4B illustrates a single block DCI format 2_3 with TCI state in accordance with some aspects. FIG. 4C illustrates one or more blocks DCI format 2_3 with TCI state in accordance with some aspects. Specifically, in FIG. 4B, the UE is configured with one block, and multiple TCI states are included one block. In this case, each TCI state applies to one UL carrier. In FIG. 4C, the UE can be configured with one or more blocks. A single TCI state is included in one block, and each block applies to one UL carrier.

In another embodiment, for an SRS with carrier switching (i.e., the SRS is triggered by DCI format 2_3), the joint DL/UL TCI state or separate DL TCI state may be used for the transmission of the triggered SRS. In DCI format 2_3, a new field may be added to indicate a joint DL/UL TCI state if joint DL/UL TCI state is used or a separate UL TCI state if a separate DL/UL TCI state is used.

In another embodiment, for an SRS triggered by DCI format 2_3, if the target carrier is Quasi Co-Located (QCLed) with the scheduling carrier (on which the DCI is carried), then the SRS may follow the TCI state of the scheduling carrier (the PDCCH or PDSCH). Thus, DCI format 2_3 may not include the TCI state. The QCL types include QCL-Type A whose channel properties include doppler shift and spread and average delay and spread to obtain channel state information (CSI), QCL-Type B whose channel properties include doppler shift and spread to obtain CSI, QCL-Type C whose channel properties include average delay and spread to obtain measurement information (such as Reference Signal Received Power (RSRP)), and QCL-Type D whose channel properties include spatial receiver parameter to support beamforming.

In another embodiment, if a common TCI that crosses multiple carriers is available, then the SRS may follow the common TCI state crossing carriers. As above, in this case, DCI format 2_3 may not include the TCI state.

In another embodiment, if a joint DL/UL TCI state is available or a separate UL or DL TCI state over the target carrier is available for an SRS triggered by DCI format 2_3, then the available TCI state may be used for the SRS transmission. As above, in this case, DCI format 2_3 may not include the TCI state.

In another embodiment, in a multi-TRP, multiple TCI states (for example two) may be included in DCI format 2_3 for each UL carrier. Alternatively, one codepoint of the TCI state field can indicate two TCI states; one TCI state for each TRP. In this case, dynamic switching between single TRP and multi-TRP may be supported, i.e., whether only one TCI state is valid or both TCI states are valid.

In another embodiment, the UE may not provide acknowledgement to the gNB for a beam indication via DCI format 2_3. When the UE transmits an aperiodic SRS, the indicated TCI state via DCI format 2_3 may be applied. In some cases, the triggered SRS may be viewed as an acknowledgement to the beam indication via DCI format 2_3.

In another embodiment, DCI format 2_3 may be extended to trigger SRS transmission from multiple UEs over the same carrier or over multiple carriers. In this case, the usage of the triggered SRS may be extended to codebook, non-codebook, and beamManagement indications.

In another embodiment, padding bits with zeros may be reused in DCI format 2_3 to reconfigure one or more SRS parameters, such as resource allocation, etc.

Slot Indication for SRS Transmission Triggered by DCI Format 2_3

In an embodiment, when an aperiodic SRS is triggered by DCI format 2_3, an available slot for the triggered SRS transmission may be indicated to the UE. The available slot may be an UL slot or a flexible slot. In the latter case, the orthogonal frequency division multiplexing (OFDM) symbols configured for SRS may be UL symbol(s) or flexible symbol(s).

The SRS resource set may be configured with a list of available slot values. The value of the available slot applied for SRS transmission may be explicitly indicated by a new DCI field(s) or implicitly indicated by the DCI codepoint of the SRS Request field or by the corresponding component carrier (CC) (e.g., using the CC index).

In another embodiment, the SRS resource set may be configured with multiple lists of available slot values, i.e., one list for each CC, when an explicit indication of the available slot for SRS transmission is triggered by DCI format 2_3.

In DCI format 2_3, for srs-TPC-PDCCH-Group=typeA, multiple DCI fields, e.g., srsSlot, may be added into one block to indicate the available slot for the SRS transmission. In this case, one DCI field may correspond to the available slot for SRS transmission over one CC.

For srs-TPC-PDCCH-Group=typeB, one DCI field, e.g., srsSlot, may be added into each block to indicate the available slot for the SRS transmission. As above, in this case, one DCI field may correspond to the available slot for SRS transmission over one CC.

For both typeA and typeB, for the same SRS resource set, the indicated available slot over different CC may be different.

Figure 5A:
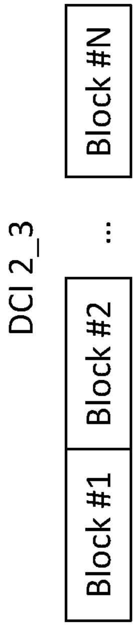
FIG. 5A illustrates DCI format 2_3 in accordance with some aspects.
Figure 5B:
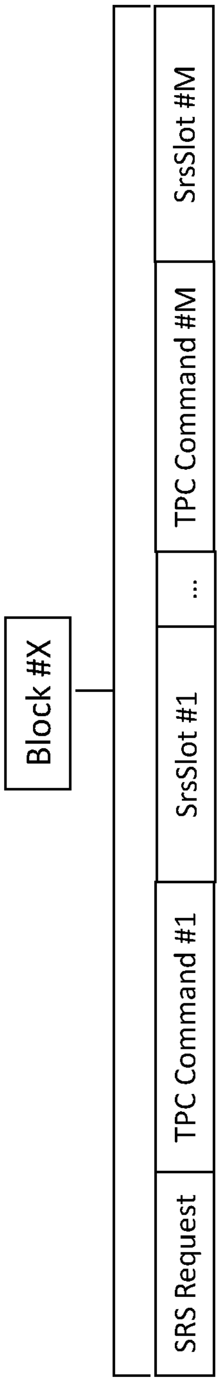
FIG. 5B illustrates a single block DCI format 2_3 with Sounding Reference Signal (SRS) Slots in accordance with some aspects.
Figure 5C:
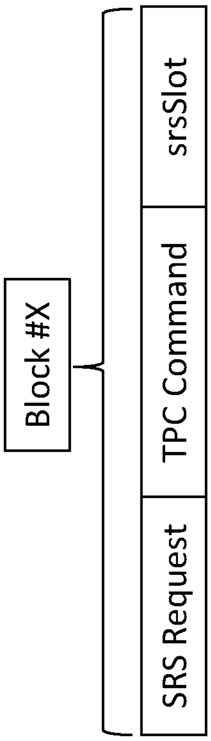
FIG. 5C illustrates one or more blocks DCI format 2_3 with srsSlots state in accordance with some aspects.

FIG. 5A illustrates DCI format 2_3 with available slot indication for SRS in accordance with some aspects. FIG. 5B illustrates a single block DCI format 2_3 with srsSlots in accordance with some aspects. FIG. 5C illustrates one or more blocks DCI format 2_3 with srsSlots state in accordance with some aspects. Specifically, in FIG. 5B, the UE is configured with one block, and multiple TCI commands and multiple srsSlots are included one block. In this case, each TCI command and srsSlot applies to one UL carrier. In FIG. 5C, the UE can be configured with one or more blocks. Each block applies to one UL carrier.

Figure 6:
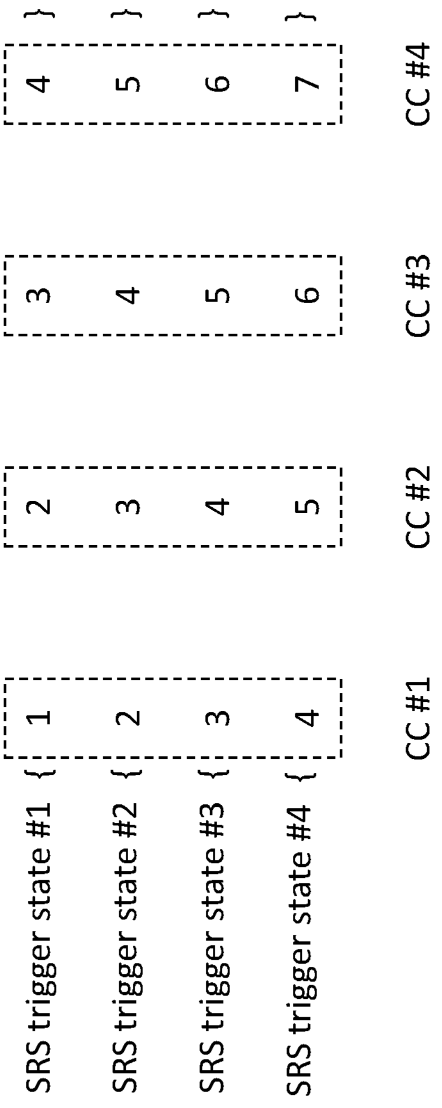
FIG. 6 illustrates implicit indication of available slots for an SRS triggered by DCI format 2_3 in accordance with some aspects.

In another embodiment, with implicit indication of available slot for SRS triggered by DCI format 2_3, the SRS resource set may be configured with multiple lists of available slot values, i.e., one list for each CC. For the same aperiodic SRS trigger state (DCI codepoint of SRS Request field), different values of an available slot may be applied for different CCs. In this case, no additional fields may be introduced into DCI format 2_3. FIG. 6 illustrates implicit indication of available slots for an SRS triggered by DCI format 2_3 in accordance with some aspects.

In another embodiment, if no new explicit field is added to DCI format 2_3 to indicate the available slot, when the aperiodic SRS resource set is configured with a list of available slot values ('t' values, for example, {t1, t2, t3, t4}. The number of 't' values is k and 1<=k<=4) and the aperiodic SRS resource set is triggered by DCI format 2_3, then one of various options may be applied to determine the transmission slot of the triggered SRS resource set. In a first option, the transmission slot is purely based on the legacy RRC parameter slotOffset (slotOffset=0 is applied if it is not configured). In a second option, the transmission slot is the available slot given by one specific 't' value—for example, the first 't' value in the configured list (indicated by t1). In a third option, the transmission slot is the first available slot, i.e., assuming t=0.

In another embodiment, if no new explicit field is added to DCI format 2_3 to indicate the available slot, when at least one aperiodic SRS resource set is configured with a list of available slot values ('t' values, for example, {t1, t2, t3, t4}. The number of 't' values is k and 1<=k<=4) and other aperiodic SRS resource set(s) are not configured with a list of available slot values, if the aperiodic SRS resource set without list of available slot values is triggered by DCI format 2_3, then one of various options may be applied to determine the transmission slot of the triggered SRS resource set. In a first option, the transmission slot is purely based on the legacy RRC parameter slotOffset (slotOffset=0 if it is not configured). In a second option, the transmission slot is the first available slot, i.e., assuming t=0.

In another embodiment, if no new explicit field is added to DCI format 2_3 to indicate the available slot, when the aperiodic SRS resource set is configured with a list of available slot values ('t' values, for example, {t1, t2, t3, t4}. The number of 't' values is k and 1<=k<=4), then the SRS resource set may not be triggered by DCI format 2_3.

In another embodiment, when at least one aperiodic SRS resource set is configured with a list of available slot values ('t' values, for example, {t1, t2, t3, t4}. The number of 't' values is k and 1<=k<=4) and other aperiodic SRS resource set(s) are not configured with a list of available slot values, to avoid collision those aperiodic SRS resource sets without configuration of list of available slot values may not be configured with the same trigger state.

In another example, those aperiodic SRS resource sets without configuration of list of available slot values may be configured with the same trigger state. In this case, a dropping rule may be defined in case a collision occurs. For example, an SRS with higher (or lower) resource set ID may be dropped. Alternatively, an SRS resource set is prioritized based on usage. Note: This embodiment may be applied to all DCI formats that can trigger an SRS, for example, DCI 0_1/0_2/1_1/1_2/2_3.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus for a 5$^{th}$ generation NodeB (gNB), the apparatus comprising:

processing circuitry to configure the gNB to:

transmit, to a user equipment (UE), a physical downlink control channel (PDCCH) having downlink control information (DCI) format 2_3 that includes a dedicated beam indication field, separate from any Transmitter Power Control (TPC) command field in the DCI format 2_3, to indicate a Transmission Configuration Indicator (TCI) state that specifies a spatial domain transmission filter to be applied by the UE for transmission of an aperiodic sounding reference signal (SRS) triggered by the DCI, the DCI format 2_3 having, after an SRS request, one of:

a single block that includes multiple Transmitter Power Control (TPC) commands and multiple TCI states in which each pair of TPC command and TCI state applies to a different uplink carrier than each other pair of TPC command and TCI state, each TCI state in the single block specifying a first spatial domain transmission filter for SRS transmission on a first corresponding uplink carrier, or at least one block that each includes a single TPC command and TCI state in which each block of the at least one block applies to a different uplink carrier than each other block of the at least one block, the TCI state in each block specifying a second spatial domain transmission filter for SRS transmission on a second corresponding uplink carrier; and receive, in response to transmission of the PDCCH, the aperiodic SRS from the UE transmitted using the first or second spatial domain transmission filter indicated by the TCI state; and a memory configured to store the DCI.

2. The apparatus of claim 1, wherein the dedicated field indicates a joint uplink and downlink TCI state.

3. The apparatus of claim 1, wherein the dedicated field indicates one of an uplink TCI state or a downlink TCI state for separate uplink and downlink TCI states.

4. The apparatus of claim 1, wherein the DCI format 2_3 has the single block.

5. The apparatus of claim 1, wherein the DCI format 2_3 has the at least one block.

6. The apparatus of claim 1, wherein:

the processing circuitry is further to configure the gNB to:

transmit the PDCCH on a scheduling carrier, and indicate to the UE that the aperiodic SRS is to be transmitted on a target carrier, the target carrier Quasi Co-Located with the scheduling carrier, the aperiodic SRS following a TCI state of the scheduling carrier, and the TCI state is not explicitly included in the DCI.

7. The apparatus of claim 1, wherein:

the processing circuitry is further to configure the gNB to indicate that a common TCI state that crosses multiple carriers is available and that the aperiodic SRS is follow the common TCI state when the carriers are crossed, and the common TCI state is not explicitly included in the DCI.

8. The apparatus of claim 1, wherein:

the processing circuitry is further to configure the gNB to indicate to the UE that the aperiodic SRS is to be transmitted on a target carrier and to use an available TCI state independent of whether the available TCI state is an available joint uplink and downlink TCI state or separate uplink or downlink TCI state, and the TCI state is not explicitly included in the DCI.

9. The apparatus of claim 1, wherein:

the processing circuitry is further to configure the gNB to provide to the UE dynamic switching between single transmission-reception point (TRP) operation and multi-TRP operation, and the DCI includes, for each uplink carrier in multi-TRP operation:

multiple TCI states, or a codepoint of a TCI state field in the DCI, the codepoint configured to indicate one of a plurality of TCI states, each of the plurality of TCI states is associated with a particular TRP.

10. The apparatus of claim 1, wherein the processing circuitry is further to configure the gNB to indicate to the UE, via the DCI, to avoid transmission of acknowledgment of a beam indication from the gNB, transmission of the aperiodic SRS acting as the acknowledgment of the beam indication from the gNB.

11. The apparatus of claim 1, wherein the processing circuitry is further to configure the gNB to trigger, via the DCI, transmission of the aperiodic SRS from multiple UEs over at least one carrier, an SRS resource set of the aperiodic SRS selected from a plurality of usages that include beam management, codebook, and non-codebook usage.

12. The apparatus of claim 1, wherein the processing circuitry is further to configure the gNB to indicate to the UE, via the DCI, an available slot for transmission of the aperiodic SRS, the available slot selected from a set of slots that include:

an uplink slot, or a flexible slot having uplink or flexible orthogonal frequency division multiplexing (OFDM) symbols configured for SRS transmission.

13. The apparatus of claim 12, wherein:

the processing circuitry is further to configure the gNB to indicate, via radio resource control (RRC) signaling, an SRS resource set having a list of available slot values, and a value of the available slot is explicitly indicated in a DCI field of the DCI.

14. The apparatus of claim 12, wherein:

the processing circuitry is further to configure the gNB to indicate, via radio resource control (RRC) signaling, an SRS resource set having multiple lists of available slot values, each list corresponding to a different component carrier, and a value of the available slot is one of:

explicitly indicated in a DCI field of the DCI, or implicitly indicated by a DCI codepoint of an SRS request field of the DCI such that different values are applied for different component carriers.

15. The apparatus of claim 1, wherein:

the processing circuitry is further to configure the gNB to indicate, via radio resource control (RRC) signaling, an SRS resource set having a list of available slot values for transmission of the aperiodic SRS, and a transmission slot for transmission of the aperiodic SRS is one of:

based on an RRC parameter slotOffet, indicated by a specific slot value in the DCI, or a first available slot.

16. The apparatus of claim 12, wherein:

the processing circuitry is further to configure the gNB to indicate, via radio resource control (RRC) signaling, an SRS resource set having a list of available slot values, and a value of the available slot is implicitly indicated by one of:

a DCI codepoint of an SRS request field of the DCI, or a component carrier index of a component carrier to carry the aperiodic SRS.

17. An apparatus for a user equipment (UE), the apparatus comprising:

processing circuitry to configure the UE to:

receive, from a $5^{th}$ generation NodeB (gNB), a physical downlink control channel (PDCCH) having downlink control information (DCI) format 2_3 that includes a dedicated beam indication field, separate from any Transmitter Power Control (TPC) command field in the DCI format 2_3, to indicate a Transmission Configuration Indicator (TCI) state that specifies a spatial domain transmission filter to be applied by the UE for transmission of an aperiodic sounding reference signal (SRS) triggered by the DCI, the DCI format 2_3 having, after an SRS request, one of:

a single block that includes multiple Transmitter Power Control (TPC) commands and multiple TCI states in which each pair of TPC command and TCI state applies to a different uplink carrier than each other pair of TPC command and TCI state, each TCI state in the single block specifying a first spatial domain transmission filter for SRS transmission on a first corresponding uplink carrier, or at least one block that each includes a single TPC command and TCI state in which each block of the at least one block applies to a different uplink carrier than each other block of the at least one block, the TCI state in each block specifying a second spatial domain transmission filter for SRS transmission on a second corresponding uplink carrier; and transmit, in response to reception of the PDCCH, the aperiodic SRS to the gNB using the first or second spatial domain transmission filter indicated by the TCI state; and a memory configured to store the DCI.

18. The apparatus of claim 17, wherein: one of:

the dedicated field indicates a joint uplink and downlink TCI state, or the dedicated field indicates one of an uplink TCI state or a downlink TCI state for separate uplink and downlink TCI states.

19. A non-transitory computer-readable storage medium that stores instructions for execution by one or more processors of a $5^{th}$ generation NodeB (gNB), the one or more processors to configure the gNB to, when the instructions are executed:

transmit, to a user equipment (UE), a physical downlink control channel (PDCCH) having downlink control information (DCI) format 2_3 that includes a dedicated beam indication field, separate from any Transmitter Power Control (TPC) command field in the DCI format 2_3, to indicate a Transmission Configuration Indicator (TCI) state that specifies a spatial domain transmission filter to be applied by the UE for transmission of an aperiodic sounding reference signal (SRS) triggered by the DCI, the DCI format 2_3 having, after an SRS request, one of:

a single block that includes multiple Transmitter Power Control (TPC) commands and multiple TCI states in which each pair of TPC command and TCI state applies to a different uplink carrier than each other pair of TPC command and TCI state, each TCI state in the single block specifying a first spatial domain transmission filter for SRS transmission on a first corresponding uplink carrier, or at least one block that each includes a single TPC command and TCI state in which each block of the at least one block applies to a different uplink carrier than each other block of the at least one block, the TCI state in each block specifying a second spatial domain transmission filter for SRS transmission on a second corresponding uplink carrier; and receive, in response to transmission of the PDCCH, the aperiodic SRS from the UE using the first or second spatial domain transmission filter indicated by the TCI state.

20. The non-transitory computer-readable storage medium of claim 19, wherein: one of:

the dedicated field indicates a joint uplink and downlink TCI state, or the dedicated field indicates one of an uplink TCI state or a downlink TCI state for separate uplink and downlink TCI states.

* * * * *